W. H. MATTHEWS.
Lamp Burner.
No. 35,061.
Patented April 22, 1862.
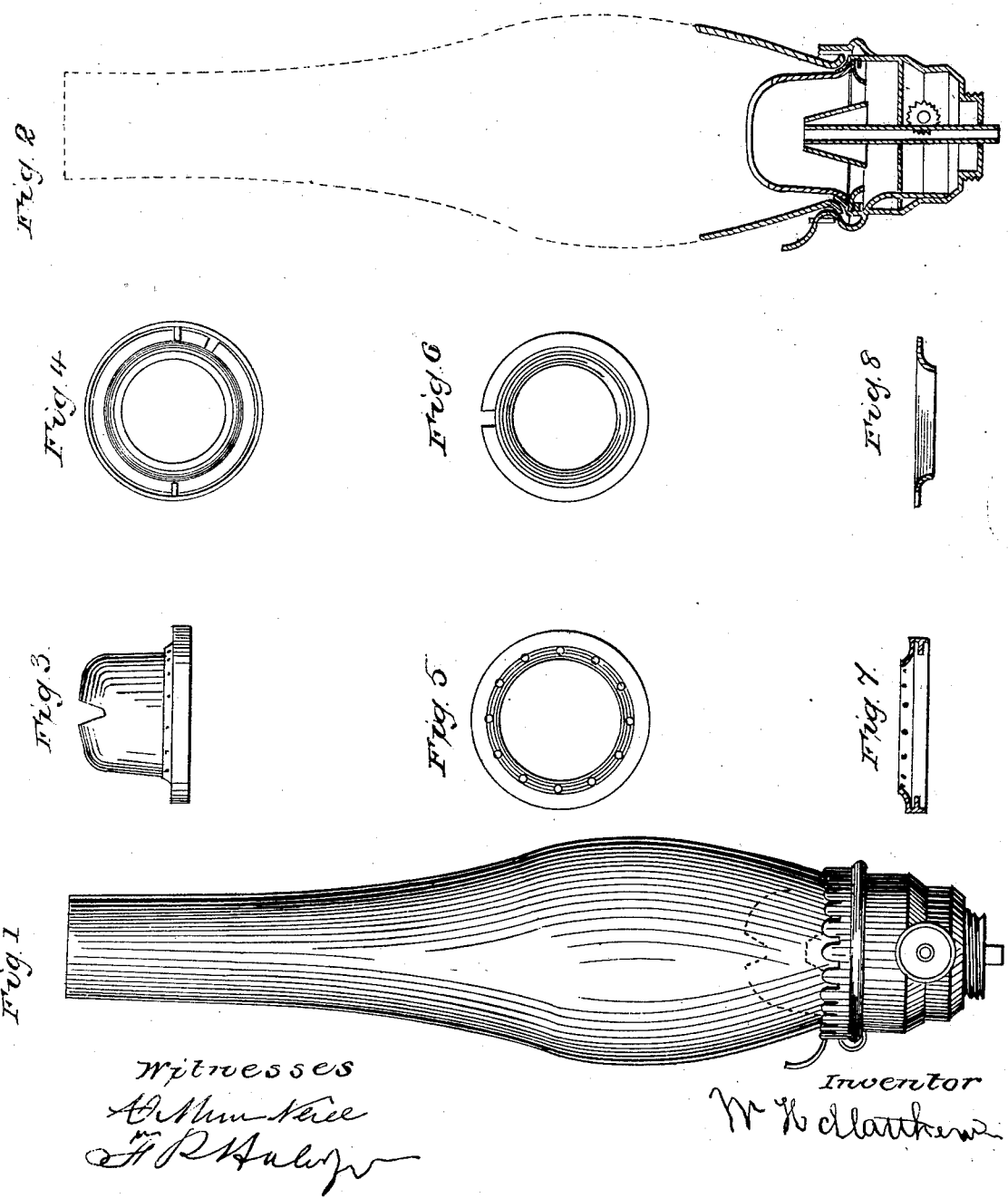

UNITED STATES PATENT OFFICE.

WILLIAM H. MATTHEWS, OF CHELSEA, MASSACHUSETTS, ASSIGNOR TO THE UNION GLASS COMPANY.

IMPROVEMENT IN GLASS DEFLECTORS FOR LAMPS.

Specification forming part of Letters Patent No. 35,061, dated April 22, 1862.

*To all whom it may concern:*

Be it known that I, WILLIAM H. MATTHEWS, a citizen of the United States of America, and a resident of Chelsea, in the county of Suffolk and State of Massachusetts, have invented a new and useful Improvement in Lamps Provided with Glass Cones or Deflectors; and I do hereby declare the same to be fully described in the following specification and represented in the accompanying drawings, of which—

Figure 1 is a side view of a burner as furnished with my invention. Fig. 2 is a vertical section of it. Fig. 3 is a side view, and Fig. 4 an under side view, of the glass cone or deflector and its metallic holder as separated from the lamp-cap. Figs. 5 and 6 are separate top views of the cap and base rings of the deflector-holder, while Figs. 7 and 8 are vertical sections of each.

My invention or improvement has reference particularly to the conical deflector when made of glass and so as to be transparent in the part which circumscribes the flame of the wick. Of late a deflector of such kind has been introduced and used in coal-oil lamps to excellent advantage. Owing, however, to its flange being made of glass, it is very likely to become broken, especially while the deflector is being put in place within the lamp-cap or may be in the act of being removed therefrom. To avoid this difficulty, I provide the glass deflector with a metallic holder separate from the lamp-cap and removable therefrom with the deflector, and I make the said holder in two parts—viz., a flanged cap and a base-ring—held together and to the flange of the glass deflector by pins or studs, as hereinafter described.

In the drawings, A denotes the lamp-cap, while B is the glass deflector or cone, of which $a$ is the flange. This flange is placed in a metallic base-ring, $b$, which, with the said flange, is covered by a flanged annulus or cap, $c$, which surrounds the lower part of the conical body of the deflector and extends over the deflector-flange $a$ and down below the edge of the base-ring $b$, as seen in the drawings. There are two projections, $e\ f$, extended inward from the flange of the cap-ring and below and against the base-ring. These projections serve to confine the two rings together and in place on the glass deflector, the base-ring being made with a notch, $g$, at its periphery to enable it to be separated from the cap-ring, such separation being rendered easy of accomplishment by simply turning the base-ring around within the cap-ring until the notch of the former comes into conjunction with one of the studs $e\ f$.

The employment of the separate cap and base rings constituting the deflector-holder renders it easy at any time to renew the deflector in case of breakage. Furthermore, the glass chimney I is placed directly upon the upper ring of the deflector-supporter, which, resting on the lamp-cap, answers the purpose of a support for the chimney, and so completely insulates it from the glass deflector as to prevent the chimney from breaking the flange of the deflector—an accident of frequent occurrence when the glass chimney is made to rest directly upon the glass flange of the deflector. Furthermore, the employment of the metallic holder with the glass deflector and chimney serves to give great steadiness to the latter, or enables it to be held firmly in place to much greater advantage and very much less liability of breakage than when made to rest on the glass flange of the deflector.

I claim—

The above-described mode of constructing the glass-deflector holder—viz., the separate cap and base rings provided with means of connecting them, as set forth, in order that they may be applied to the glass deflector and its flange, as specified.

W. H. MATTHEWS.

Witnesses:
R. H. EDDY,
F. P. HALE, Jr.